(12) United States Patent
Kumbi et al.

(10) Patent No.: US 7,904,406 B2
(45) Date of Patent: Mar. 8, 2011

(54) ENABLING VALIDATION OF DATA STORED ON A SERVER SYSTEM

(75) Inventors: Niranjan Kumbi, Davanagere (IN); Amulya Mishra, Jharsuguda (IN)

(73) Assignee: Oracle International Corporation, Redwood Shores, CA (US)

( * ) Notice: Subject to any disclaimer, the term of this patent is extended or adjusted under 35 U.S.C. 154(b) by 895 days.

(21) Appl. No.: 11/772,255

(22) Filed: Jul. 2, 2007

(65) Prior Publication Data

US 2008/0313120 A1    Dec. 18, 2008

(30) Foreign Application Priority Data

May 4, 2007    (IN) .............................. 954/CHE/2007

(51) Int. Cl.
*G06F 17/00*    (2006.01)
*G06N 5/02*    (2006.01)

(52) U.S. Cl. ......................................................... 706/47
(58) Field of Classification Search ....................... None
See application file for complete search history.

(56) References Cited

U.S. PATENT DOCUMENTS

2003/0084179 A1* 5/2003 Kime et al. .................... 709/231
2007/0100967 A1* 5/2007 Smith et al. .................... 709/219

* cited by examiner

*Primary Examiner* — Michael B. Holmes
*Assistant Examiner* — Peter Coughlan
(74) *Attorney, Agent, or Firm* — Narendra R. Thappeta

(57) ABSTRACT

Enabling validation of data stored on a server system. According to an aspect of the invention, a portion of the data is received at a client system and processed based on a rule to generate a result. The generated result is used to determine the compliance of the received portion of data with a requirement and thus validate the portion of data. According to another aspect, a user is provided a convenient interface to generate rules (including the requirement) for validating data stored on a server system.

19 Claims, 9 Drawing Sheets

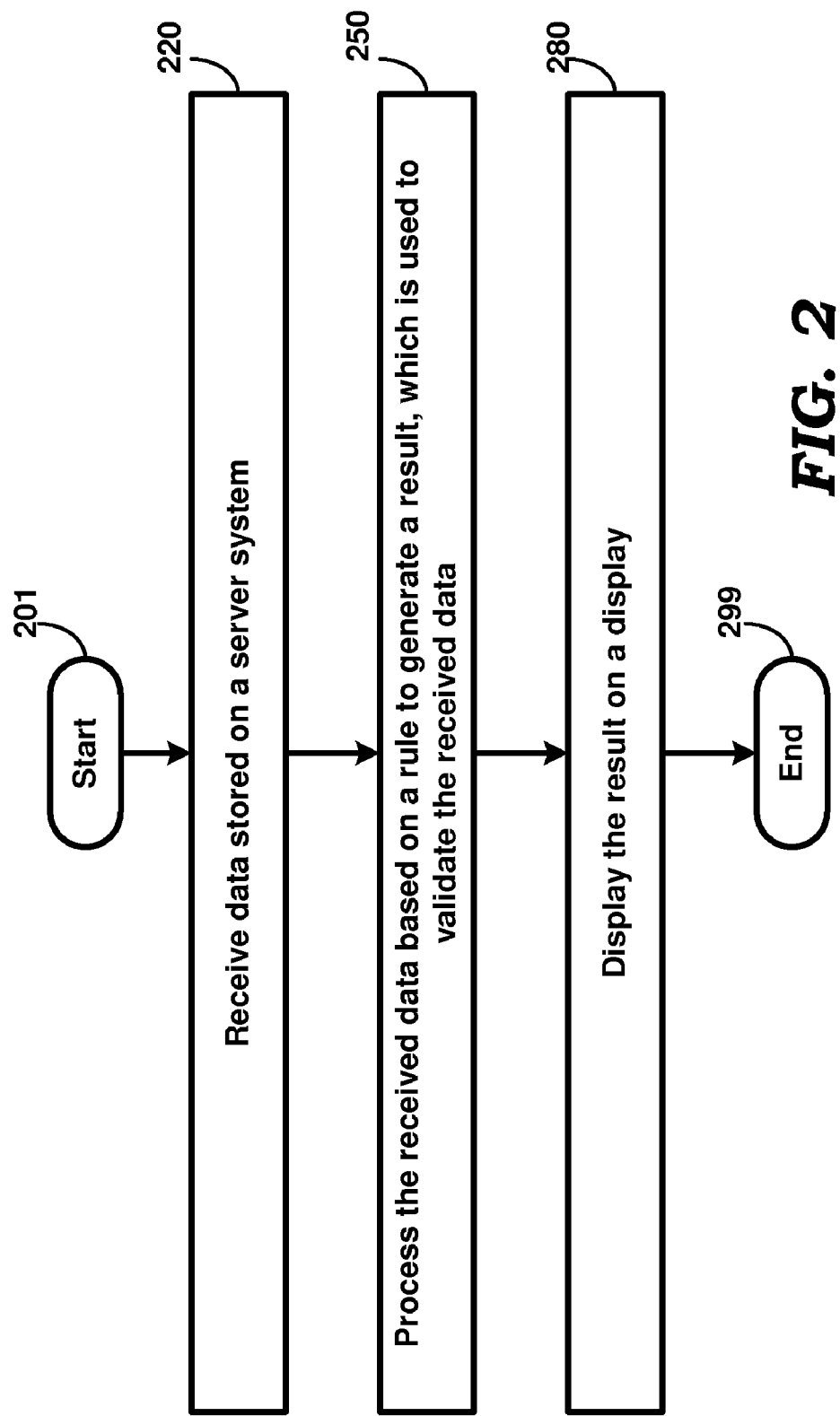

```xml
321: <?xml version="1.0" encoding="UTF-8"?>
322: <?xml-stylesheet type="text/xsl" href="rules.xsl"?>
323: <root>
324:     <budget_version type="object">
325:         <project_id>1000</project_id>
326:         <budget_version_id>2000</budget_version_id>
327:         <total_raw_cost>1000</total_raw_cost>
328:         <budget_lines type="list">
329:             <budget_line type="object">
330:                 <budget_line_id>3001</budget_line_id>
331:                 <raw_cost>200</raw_cost>
332:             </budget_line>
333:             <budget_line type="object">
334:                 <budget_line_id>3002</budget_line_id>
335:                 <raw_cost>300</raw_cost>
336:             </budget_line>
337:             <budget_line type="object">
338:                 <budget_line_id>3003</budget_line_id>
339:                 <raw_cost>500</raw_cost>
340:             </budget_line>
341:         </budget_lines>
342:     </budget_version>
343:     <budget_version type="object">
344:         <project_id>1000</project_id>
345:         <budget_version_id>2001</budget_version_id>
346:         <total_raw_cost>2000</total_raw_cost>
347:         <budget_lines type="list">
348:             <budget_line type="object">
349:                 <budget_line_id>3004</budget_line_id>
350:                 <raw_cost>1000</raw_cost>
351:             </budget_line>
352:             <budget_line type="object">
353:                 <budget_line_id>3005</budget_line_id>
354:                 <raw_cost>500</raw_cost>
355:             </budget_line>
356:             <budget_line type="object">
357:                 <budget_line_id>3006</budget_line_id>
358:                 <raw_cost>600</raw_cost>
359:             </budget_line type="object">
360:         </budget_lines>
361:     </budget_version>
362: </root>
```

*FIG.3*

```
421: <?xml version="1.0" encoding="UTF-8"?>
422: <xsl:stylesheet version="1.0" xmlns:xsl="http://www.w3.org/1999/XSL/Transform">
423: <xsl:variable name="sum_r" select="1500"/>
424: <xsl:template match="root">
425:     <html><body>
426:     <h2>Validation Results</h2>
427:     <table border="1">
428:     <tr bgcolor="#9acd32">
429:         <th align="left">Budget Version</th>
430:         <th align="left">Header Cost</th>
431:         <th align="left">Total Detail Cost</th>
432:         <th align="left">Header cost = Detail Cost?</th>
433:         <th align="left">Header cost < Limit?</th>
434:     </tr>
435:     <xsl:for-each select="budget_version">
436:     <tr
437:         <td><xsl:value-of select="budget_version_id"/></td>
438:         <td><xsl:value-of select="total_raw_cost"/></td>
439:         <td><xsl:value-of select="sum(budget_lines/budget_line/raw_cost)"/></td>
440:         <td>
441:             <xsl:if test="total_raw_cost = sum(budget_lines/budget_line/raw_cost)">
442:                 Pass
443:             </xsl:if>
444:             <xsl:if test="total_raw_cost != sum(budget_lines/budget_line/raw_cost)">
445:                 Fail
446:             </xsl:if>
447:         </td>
448:         <td>
449:             <xsl:if test="total_raw_cost < $sum_r">
450:                 Pass
451:             </xsl:if>
452:             <xsl:if test="total_raw_cost > $sum_r">
453:                 Fail
454:             </xsl:if>
455:         </td>
456:     </tr>
457:     </xsl:for-each>
458:     </table>
459:     </body> </html>
460: </xsl:template>
461: </xsl:stylesheet>
```

FIG. 4

| | 510 | 520 | 530 | 540 | 550 |
|---|---|---|---|---|---|
| | Budget Version | Header Cost | Total Detail Cost | Header Cost=Detail Cost? | Header Cost < Limit? |
| 570 / 574 | 2000 | 1000 | 1000 | Pass | Pass |
| 578 | 2001 | 2000 | 2100 | Fail | Fail |

*FIG. 5*

```
811:function nlmain(bo, attrib, func, cond){
812:    var str;
813:    if (func=="sum"){
814:        if (bo != null )
815:            str = "Compute Sum of all " + bo;
816:        if (attrib != null)
817:            str = str + ">" + attrib;
818:    }
819:    if (func=="locate") {
820:        if (bo != null )
821:            str = "Check if " + bo;
822:        if (attrib != null)
823:            str = str + "." + attrib + " satisfies the condition " + cond;
824:    }
825:    return str;
826:}

827:function xslmain(bo, attrib, func, cond){
828:    var str;
829:    if (func=="sum") {
830:        if (bo != null )
831:            str = "//" + bo;
832:        if (attrib != null)
833:            str = str + "//" + attrib;
834:        str = "<xsl:value-of select=\"sum(" + str + ")\"/>";
835:    }
836:    if (func=="locate") {
837:        if (bo != null )
838:            str = "//" + bo;
839:        if (attrib != null)
840:            str = str + "//" + attrib + cond;
841:        str = "<xsl:value-of select=\"" + str + "\"/>";
842:    }
846:    str = "<?xml version=\"1.0\" encoding=\"UTF-8\"?> \n +
847:        "<xsl:stylesheet version=\"1.0\" xmlns:xsl=\"http://www.w3.org/1999/XSL/Transform\"> \n"
    +
848:        "<xsl:template match=\"/\">\n\n<html>\n<body> \n " + str +
849:        "\n </body>\n</html>\n</xsl:template>\n</xsl:stylesheet>";
850:    return str;
851:}
```

*FIG. 8*

ENABLING VALIDATION OF DATA STORED ON A SERVER SYSTEM

RELATED APPLICATION

The present application is related to and claims priority from the co-pending India Patent Application entitled, "Enabling Validation Of Data Stored On A Server System", Ser. No.: 954/CHE/2007, Filed: May 4, 2007, naming the same inventors as in the subject patent application, and is incorporated in its entirety herewith.

BACKGROUND

1. Technical Field

The present disclosure relates to data maintenance and more specifically to enabling validation of data stored on a server system.

2. Related Art

Data is often stored on server systems, which generally provide a centralized storage such that several other systems (e.g., client systems or server systems) can access the data. By storing the data centrally, sharing/exchanging of data is generally simplified.

There is a need to validate data stored on server systems. Validation refers to verifying that the stored data is accurate according to applicable requirements. Examples of such requirements include ensuring that the data is not corrupted, data elements are consistent with the other data present, and compliance with some pre-specified rules, etc.

In one embodiment, validation of data stored on a server system is facilitated by providing software programs executing on the same or other server systems. Thus, a user may cause the software programs on the server systems to be executed to validate the data stored on the server system.

One disadvantage with such an approach is that the validations performed and/or the data checked is controlled by the software programs executing on the server system.

BRIEF DESCRIPTION OF THE DRAWINGS

Example embodiments of the present invention will be described with reference to the accompanying drawings briefly described below.

FIG. 2 is a flowchart illustrating the manner in which validation of data stored on a server system is enabled according to an aspect of the present invention.

FIG. 3 depicts a portion of a data file received from a server system containing data to be validated in an embodiment.

FIG. 4 depicts a portion of a rule file specifying a logic for processing data received from a server system in an embodiment.

FIG. 5 depicts a portion of a screen displayed when the result of processing a data file using a rule file is viewed using a browser in an embodiment.

FIG. 8 depicts a portion of software code executed to generate a rule for validating data from the values specified in a user interface in an embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present invention enables a user to validate data stored on a server system. A portion of the data is received at a client system and processed based on a rule to generate a result. The generated result is used to determine the compliance of the received portion of data with a requirement and thus validate the portion of data. For example, the rule may determine an aggregate value of detail data and the computed aggregate value may then be compared either manually or automatically with an expected value in a master data stored in the server system.

Another aspect of the present invention enables a user to generate rules for validating data stored on a server system. A portion of data is received and the business objects and the corresponding business attributes are identified in the received portion of data. The identified business objects and corresponding business attributes are displayed to the user. A rule is generated based on the business objects and the corresponding business attributes selected by the user.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
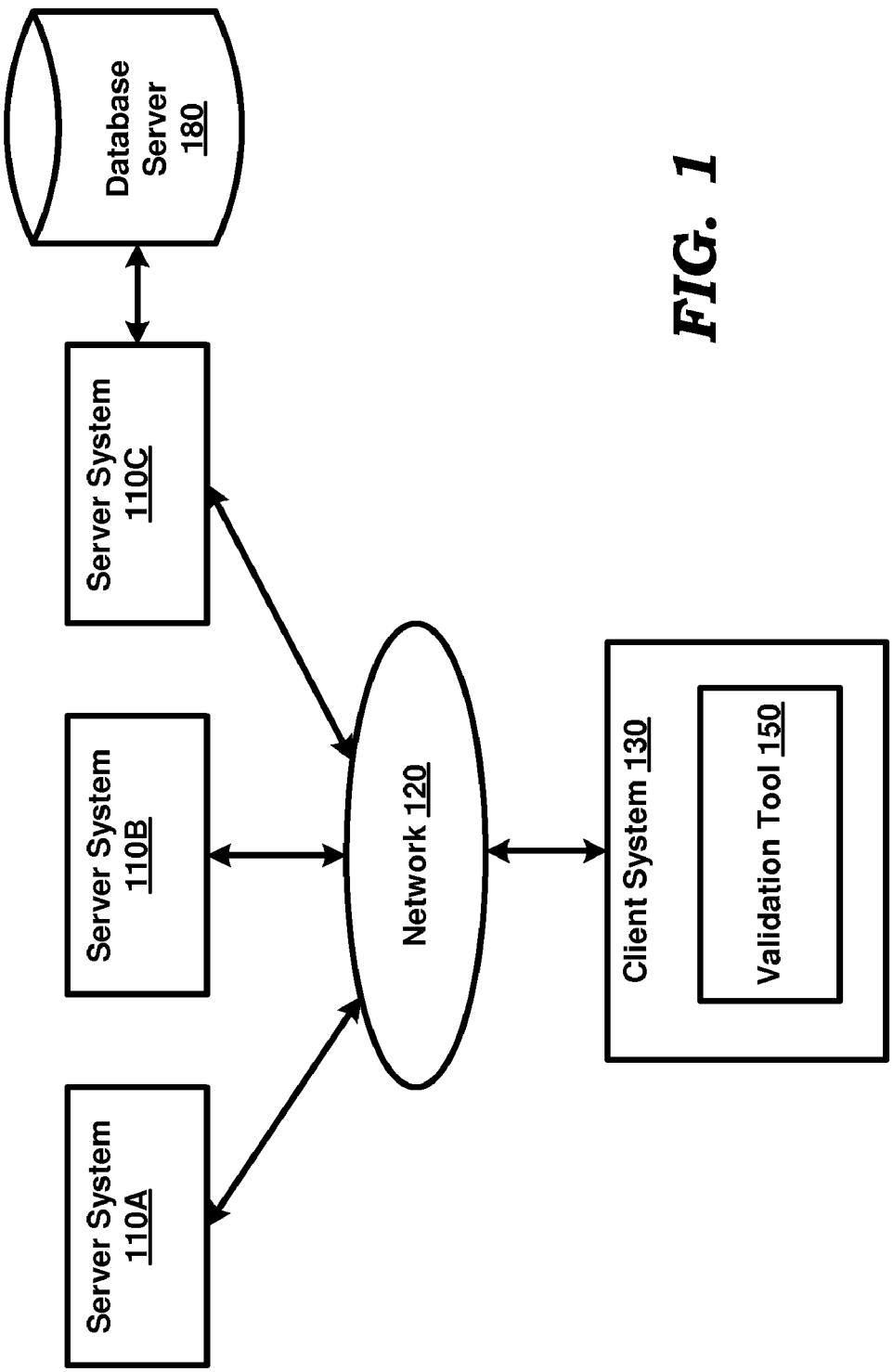
FIG. 1 is a block diagram illustrating an example environment in which various aspects of the present invention can be implemented.

FIG. 1 is a block diagram illustrating an example environment in which various aspects of the present invention can be implemented. The block diagram is shown containing server systems 110A-110C, network 120, client system 130, (executing validation tool 150) and database server 180. Merely for illustration, only representative number/type of systems are shown in the Figure. Many environments often contain many more systems, both in number and in type, depending on the purpose for which the environment is designed. Each system/device of FIG. 1 is described below in further detail.

Network 120 provides connectivity between various server systems 110A-110C and client system 130. Network 120 may be implemented using protocols such as Internet Protocol (IP) well known in the relevant arts. Database server 180 facilitates storage and retrieval of a collection of data using structured queries such as SQL in the case of relational database technologies.

Each of server systems 110A-110C represents a server system, such as a web/application server, which contains software applications capable of performing operations requested by client system 130. A server system may perform the operations on data maintained internally or on external data (for example, maintained in database server 180). It may be necessary to validate such internal/external data on the server system.

The server systems are shown as a middle-tier between the client system and the database server merely for illustration. However, several features of the invention may be implemented even if client system 130 accesses database server 180 directly.

Client system 130 represents a system such as a personal computer, workstation, mobile station, etc. Client system 130 may be used by a user to generate requests (for performing operations) to one of server systems 110A-110C. The requests may be generated according to a suitable interface.

Validation tool 150 represents a software program (executing in the environment of client system 130) that is capable of validating data stored on one of server systems 110A-110*c* or on database server 180. The manner in which validation tool 150 enables a user to perform validation of data stored on server systems 110A-110C is described with examples below.

3. Validating Data

FIG. 2 is a flowchart illustrating the manner in which validation of data stored on a server system is enabled according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations contemplated to be covered by several aspects of the present invention. The flow chart begins in step 201, in which control immediately passes to step 220.

In step 220, validation tool 150 receives data stored on a server system (such as server system 110C). The data may be received from server system 110C and may represent the internal data stored on server system 110C and/or data maintained on database server 180. The data may be received in any convenient format pre-specified by validation tool 150.

In step 250, validation tool 150 processes the received data based on a rule to generate a result, which is used to validate the received data. The rule may specify a logic by which the received data is to be processed. The rules may be specified by a user using a suitable interface at client system 130. The result generated by processing the received data based on the rule may be used to determine compliance of the data with a requirement.

It may be appreciated that the logic (in the rule) may further specify a condition that is to be satisfied by the received data. The condition may contain a comparison of the generated result with a data element (either specified by the user or contained in the received data) using a logical relation. For example, the result may be compared to a maximum limit using a 'less than' relation, that is, validation of the data is determined to be a success if the result is less than the maximum limit and a failure otherwise.

In step 280, validation tool 150 displays the result on a display. The displayed result may indicate the success or failure of validation, in the scenario when the logic specifies a condition. Alternatively, the generated result may be displayed to the user, who then determines the success or failure of validation manually. The displayed results may be stored in a secondary memory for further processing. The flow chart ends in step 299.

It may be appreciated that validation tool 150 and server system 110C may be designed such that validation tool 150 receives data from server system 110C at regular intervals of time. As such, validation tool 150 may perform the verification of data (based on the same rule) at regular intervals. Thus, earlier detection of invalid data stored on the server system may be facilitated.

Further, validation tool 150 may receive different sets of data from different server systems and verify the different sets based on the same rule. As such, the accuracy of data stored on the various server systems may be verified/validated. Such a feature of validating data on multiple servers using the same rules may be required in scenarios where server systems maintain backup copies of data stored on other server systems, and it may be desirable to ensure that the data and its backup copies are maintained (validated) in sync with each other.

Thus, the validation tool receives data stored on a server system and processes the received data based on rules. The result of processing is used to validate the received data. The manner in which validation of data stored on a server system is enabled is illustrated with examples below.

4. Example Illustrating Validation of Data

FIGS. 3, 4, and 5 illustrate the manner in which data stored on a server system is validated in an embodiment. Each of the Figures is described in detail below.

For convenience, the data stored in a server system may be viewed as containing data elements (units of identifiable information) such as business objects and business attributes. A business object represents a physical/logical object of significance to a business/organization, for example, a sales order, or department.

A business object may be associated with multiple business attributes. For example, business object department may be associated with business attributes such as name of the department and the number of employees working in the department. In addition, a business object may contain child business objects for example a department business object may contain employee business objects (associated with corresponding employee business attributes).

It may be appreciated that a business object may correspond to the data stored in a row in a table in database server 180 with the business attributes corresponding to the column values in the row. Further, the row in the table may have a reference to (or identify a row or multiple rows in) another table in database server 180. The business object corresponding to the row may then include the data stored in the referenced row (constituting another business object) as child objects. The data in the table may be retrieved from database server 180 and converted to a suitable format (for sending on network 120) by server system 110C.

Validation tool 150 then receives the data stored on server system 110C in the form of data files containing the business objects with corresponding business attributes. Validation tool 150 processes the received data file using rule files, with each rule file containing a rule. The processing of the data file with a rule file generates a result file containing the result of processing, which is then displayed to the user.

FIG. 3 depicts a portion of a data file received from a server system containing data to be validated in an embodiment. Though the content is shown encoded in extensible markup language (XML) according to one convention, other encoding/formats and conventions may be used for representing the data stored on the server system.

Line 321 (tag "<?xml?>") indicates that the data in the received data file is encoded as XML. Line 322 (tag "<?xml-stylesheet?>") specifies a rule file ("rules.xsl" corresponding to the "href" attribute) containing the rule that is to be used to process the data in the received data file.

It may be appreciated that the value of the "href" attribute may be specified as an empty string "" (or entire line 322 may be absent) when the file is received from one of server systems 110A-110C. Validation tool 150 may then need to insert (the line containing) the name of the rule file (containing the rule that is to be verified) in the received data before processing. Further, to verify multiple rules, validation tool 150 may be required to repeatedly perform the steps of insertion of the name of the rule file and processing of data file for each of the rules.

Lines 323-362 (in between tags "<root>" and "</root>") represent the data received from a server system that needs to be validated. As described above, the data may be viewed as containing different business objects, with each business object having corresponding business attributes. In the embodiment described below, the received data contains flags (attributes of the tags) indicating the business objects/attributes in the data. Alternatively, the business objects and business attributes may be determined by inspecting the structure of the received data.

Thus, lines 324-342 (in between tags "<budget_version>" and "</budget_version>") depict a business object (as specified by the value "object" for the attribute "type" in line 324) with the name "budget_version". It may be appreciated that names and/or descriptions of each business object/attribute may be included in the received data or alternatively determined from the tags in a pre-determined manner.

In general, a business object tag contains child tags. Each of the child tags may be associated with the attribute "type" (similar to the tag in line 324). In the scenario, that a child tag does not have the "type" attribute, the child tag is determined to specify a business attribute of the business object. In the scenario that a child tag is associated with a "type" attribute, the value of the "type" attribute determines whether a single child business object is specified (value is "object") or a list of child business objects is specified (value is "list"). It may be appreciated that the value of the type attribute may be determined and added by the server system from which the data is received.

Thus, the business object "budget_version" has three business attributes namely "project_id", "budget_version_id", and "total_raw_cost". In line 325, the business attribute "project_id" (in between tags "<project_id>" and "</project_id>") is shown associated with the value of "1000". In line 326, the business attribute "budget_version_id" (in between tags "<budget_version_id>" and "</budget_version_id>") is shown associated with the value of "2000". In line 327, the business attribute "total_raw_cost" (in between tags "<total_raw_cost>" and "</total_raw_cost>") is shown associated with the value of "1000".

Lines 328-341 (in between tags "<budget_lines>" and "</budget_lines>") depict a list of child objects of the business object "budget_version". In particular, lines 329-332 (in between tags "<business_line>" and "</business_line>") depict a business object "budget_line" which is a child of the "budget_version" business object. The "budget_line" business object has two business attributes namely "budget_line_id" with the value of "3001" as depicted in line 330 and "raw_cost" with the value of "200" as depicted in line 331. Similarly, lines 333-336 and lines 337-340 depict other instances of the "budget_line" object with different values for the corresponding business attributes.

Lines 343-361 depict another instance of the business object "budget_version", with the business attributes set to a different set of values. In addition, the business object is depicted containing a different list of instances of the child object "budget_line".

Thus, the data stored on a server system is received by validation tool 150 in the form of a data file encoded in XML. The received data is then processed using a rule file (specified in line 322). The manner in which a rule file can be specified is described with examples below.

5. Specifying a Rule

FIG. 4 depicts a portion of a rule file specifying a logic for processing data received from a server system in an embodiment. Though the content is shown encoded in extensible style sheet language (XSL) according to one convention, other encoding/formats and conventions may be used for representing the data stored on the server system.

In general, the rules (XSL) file contains various portions of text and (XML) tags specifying the conditions under which each of the portions of text is to be included in the output/result. A XSLT processor (contained in validation tool 150) on receiving the XML data file and the referenced XSL rule file, verifies the conditions specified in the rules file based on the data in the XML file and on successful verification includes the corresponding portion of text in the result. In the embodiment described below, the portions of text contain extensible hypertext markup language (XHTML) tags.

Line 421 (tag "<?xml?>") indicates that the data in the rule file is encoded as XML. Lines 422-461 (in between tags "<xsl:stylesheet>" and "</xsl:stylesheet>") depict a rule that is to be used to process the received data file. Line 423 (tag "<xsl:variable>") defines a variable named "sum_r" having a value "1500". The value of the variable "sum_r" may correspond to a pre-defined limit that needs to be validated in the received data.

Lines 424-460 (in between tags "<xsl:template>" and "</xsl:template>") depicts a portion of the rule that is to be processed only when a tag "root" is found in the received data (matches the tag "<root>" in line 323). Lines 425-434 and lines 458-459 depict text (containing XHTML tags) to be included in the output in the scenario when a "root" tag is matched in the received data. The XHTML tags specify that a table with a header be displayed to a user, when the output is viewed using a browser.

Lines 435-457 (in between tags "<xsl:for-each>" and "</xsl:for-each>") depicts a portion of the rule that is to be repeated for each occurrence of the "budget_version" business object (as specified by the "select" attribute) in the received data. Each occurrence of the business object is displayed as a corresponding row (due to the XHTML tags "<tr>" and "</tr>" included in the output in respective lines 436 and 456) of the table in the browser.

In lines 437-455, various values are included in the output (as columns of the table). In line 437 (tag "<xsl:value-of>"), the value of the business attribute "budget_version_id" corresponding to the instance of the "budget_version" business object is included in the output. Similarly in line 438, the value of the business attribute "total_raw_cost" is also included. In line 439, the sum of the values of the business attribute "raw_cost" of the child business objects named "budget_line" contained in the list of child business objects "budget_lines" (as specified by the value "sum(budget_lines/budget_line/raw_cost)" for the "select" attribute) is calculated and included in the output.

Lines 441-443 (in between tags "<xsl:if>" and "</xsl:if>") depicts a portion of the rule that is to be included in the output only if a condition (specified by the "test" attribute in line 441) is satisfied by the received data. Thus, line 442 is included in the output only when the value of the business attribute "total_raw_cost" of the business object is equal to the sum of the "raw_cost" business attribute of the child objects "budget_lines". Lines 444-446 depict a portion of the rule where the condition is opposite to the condition specified in lines 441-443. Therefore, line 445 is included in the output if the condition specified in line 441 is not true.

Similarly lines 449-451 and lines 452-454 depict two portions of text that are to be included in the output based on whether the condition specified in line 449 is true or false. The condition in line 449 is true only in the scenario when the value of the "total_raw_cost" business attribute of the "budget_version" business object is less than a pre-defined limit (as specified by the value of the variable "sum_r" defined in line 423).

It may be appreciated that the above portions of the rule may be included in a rule file named "rules.xsl" and may correspond to the rule file specified in line 322 of the data file. Alternatively, the name of the above described rule file may be received and inserted at line 322 of the data file. The XSLT processor (contained in validation tool 150) then verifies the modified data file with respect to the referenced rule file and generates the result (containing text and XHTML tags). The results of processing the received data file using a rule file may be displayed to a user as described with examples below.

6. Displaying Results

FIG. 5 depicts a portion of a screen displayed when the result of processing a data file (depicted in FIG. 3) using a rule file (depicted in FIG. 4) is viewed using a browser in an embodiment. It may be appreciated that by including various XHTML tags in the output generated during validation of the data, appropriate screens required by the user may be generated and displayed.

Broadly, the results of verification/validation are displayed in the form of a table with an appropriate header. Each instance of the business object named "budget_version" in the received data is depicted as a corresponding row in the table. The various values of the business attributes (or calculated from a combination of the business attributes) are displayed as columns in the table.

Columns 510 (labeled "Budget Version") and 520 (labeled "Header Cost") depict the values of the business attributes "budget_version_id" and "total_raw_cost" corresponding to each of the "budget_version" business objects. The display is generated corresponding to the text included in the output/result in lines 437 and 438 respectively. Column 530 (labeled "Total Detail Cost") depicts the sum of the values of the business attribute "raw_cost" associated with the child business objects "budget_line" contained in the business object "budget_version". The values are generated based on the text included in the result in line 439.

Column 540 (labeled "Header Cost =Detail Cost?") depicts the result of validation performed in lines 441-446. Thus, column 540 displays the result of validating that the value of the business attribute "total_raw_cost" of each business object "budget_version" is equal to the sum of the "raw_cost" business attribute of the child objects "budget_line" contained in the business object. The column may contain the value "Pass" in the scenario that the text in line 442 is included in the result and the value "Fail" when the text in line 445 is included in the result.

Similarly, column 550 (labeled "Header Cost<Limit") depicts the result of validating that the value of the "total_raw_cost" business attribute of the "budget_version" business object is less than the value of the variable "sum_r" (performed in lines 449-454).

Row 570 depicts the header of the table included in the result in lines 428-434 when a data file (as depicted in FIG. 3) is processed using a rule file (as depicted in FIG. 4).

Row 574 depicts the result of processing the data shown in lines 324-342 (corresponding to a "budget_version" business object) using the rules contained in the rule file. The values "2000" and "1000" of the business attributes "budget_version_id" and "total_raw_cost" (as shown in lines 326 and 327) are included in the output. The sum of the values "200", "300", and "500" for the business attribute "raw_cost" of the child object "budget_line" (as shown in lines 331, 335, and 339 respectively) are summated and the sum "1000" is displayed in column 530 of row 574.

The summated value "1000" is then compared for equality with the value "1000" corresponding to the business attribute "total_raw_cost" and the result of comparison "Pass" is displayed in column 540 of row 574. Further, the value "1000" of the business attribute "total_raw_cost" is checked to be less than the value "1500" (of the variable "sum_r") and the result of checking "Pass" is displayed in column 550 of row 574.

Similarly, row 578 depicts the result of processing the data shown in lines 343-361 (corresponding to another "budget_version" business object) using the rules contained in the rule file.

It may be observed that result of comparison displayed in column 540 may be manually obtained by comparing the value displayed in column 520 with the value displayed in column 530. As such, in row 574, the values in column 520 and 530 are equal ("1000") indicating that the data is valid (as also indicated by the value "Pass" in column 540). In row 578, the values in column 520 and 530 are different ("2000" and "2100") indicating that the data is invalid (as also indicated by the value "Fail" in column 540).

It may be further observed that the result of validation displayed in column 550 may not be performed manually since the value "1500" (of the variable "sum_r") associated with the pre-defined "limit" may not be known to a user viewing the results. As such, the result of processing the data received from a server system using a rule may provide manual or automated validation.

Thus, the data received in the form of data files from a server system is processed using rules stored in a rule file. The results of processing may indicate the success or failure of validating the received data. Alternatively, the results may be displayed to a user enabling the user to manually validate the data. It may be appreciated that by specifying various rules, a user may ensure the accuracy of data stored in a server system (or a database server). An aspect of the present invention enables a user to generate rules for validating data as described with examples below.

7. Generating Rules

Figure 6:
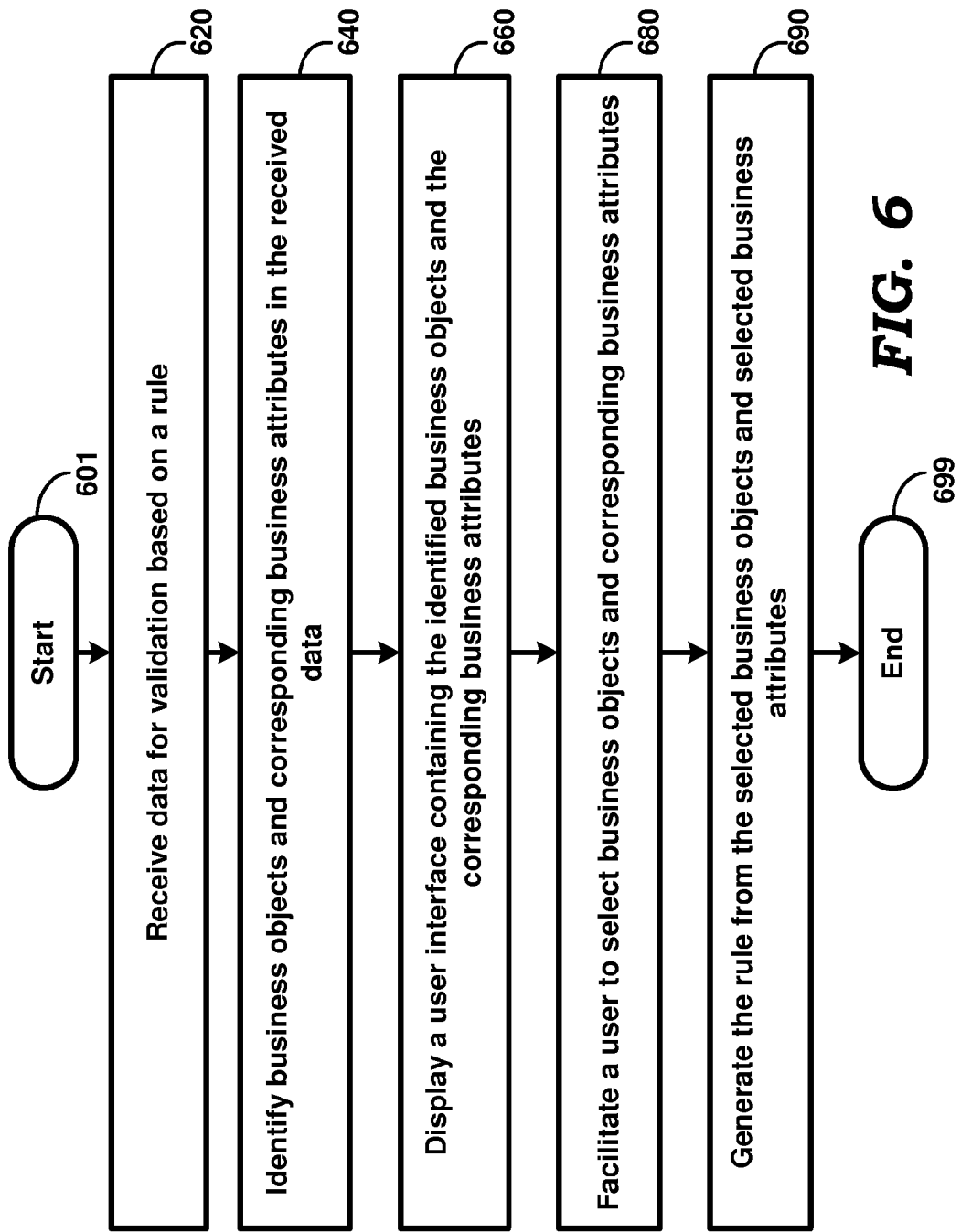
FIG. 6 is a flowchart illustrating the manner in which a rule for processing data is generated according to an aspect of the present invention.

FIG. 6 is a flowchart illustrating the manner in which a rule for processing data is generated according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

Though the steps are shown as being performed by validation tool 150, it may be appreciated that the rules may be generated in other systems/applications (not shown) and deployed eventually on validation tool 150. In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 601, in which control immediately passes to step 620.

In step 620, validation tool 150 receives data for validation based on a rule. The data may be received from server system 110C and may represent the internal data stored on server system 110C and/or data maintained on database server 180. The data may be received in any convenient format prespecified by validation tool 150.

In step 640, validation tool 150 identifies business objects and corresponding business attributes in the received data. As described above, the business objects and corresponding business attributes may be identified by inspecting the structure of the received data. Alternatively, the data may contain flags associated with the various data elements in the data indicating the types (such as business object, business attribute) of the data elements.

In step 660, validation tool 150 displays a user interface containing the identified business objects and the corresponding business attributes. The user interface may be displayed on a display unit (not shown in FIG. 1) associated with client system 130. In one embodiment, a web page is created containing the identifiers/names associated with the identified business objects and business attributes. The web page is then displayed using a browser.

In step 680, validation tool 150 facilitates a user to select business objects and corresponding business attributes. The user may select the business objects/attributes needed to specify a requirement (logic) that is to be satisfied by the data received in step 620.

In step 690, validation tool 150 generates the rule (used for validation of the received data) from the selected business objects and the selected business attributes. The flow chart ends in step 699.

It may be appreciated that the user interface may contain other display elements facilitating a user to specify rules using the selected business objects and corresponding business attributes. In one embodiment, a set of functions is also displayed in the user interface, thus enabling the user to select functions and link the functions to the business objects/attributes based on the requirements thereby specifying the rules. The manner in which a rule is generated based on the selected business objects/attributes (and the selected functions associated with them) is illustrated below with an example.

8. Example Illustrating Generation of Rules

Figure 7:
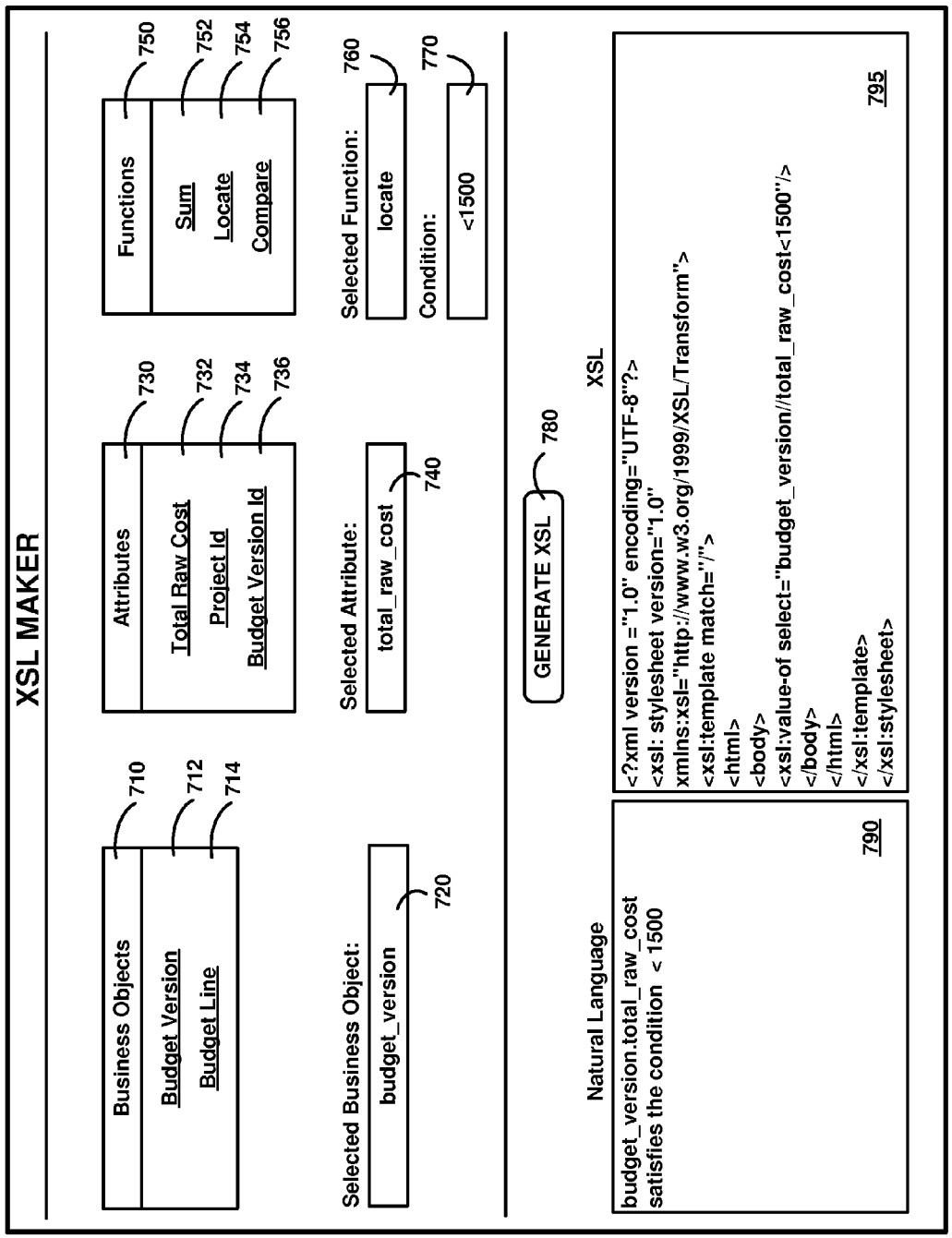
FIG. 7 depicts a user interface created from data received for validation in an embodiment.

FIGS. 7 and 8 together illustrate the manner in which a rule for validating data is generated in an embodiment. Each of the Figures is described in detail below.

FIG. 7 depicts a user interface created from data (as depicted in FIG. 3) received for validation in an embodiment. As described above, the data may be received from one of servers systems 110A-110C and the data may correspond to internal data (stored in the server system) or external data (such as data stored in database server 180).

Table 710 depicts the various business objects identified by validation tool 150 in the data received for validation. It may be observed that the data depicted in FIG. 3 contains two business objects identified by their identifiers/names "budget_version" and "budget_line" (data elements having the "type" attribute set to "object"). The identified business objects "budget_version" and "budget_line" are depicted as links 712 "Budget Version" and 714 "Budget Line" respectively. The text associated with the links either may be included in the data or may be generated from the names of the business objects in a pre-defined manner (such as title casing the name after replacing each occurrence of the underscore character with a space character).

Text box 720 displays the business object ("budget_version") selected by a user. The user may select a business object by clicking on the corresponding link (in this example, link 712) and the selected business object may then be displayed in text box 720.

Table 730 depicts the various business attributes associated with the selected business object (as shown in text box 720). The business attributes corresponding to the business objects may be identified from the data received for validation (data elements having no "type" attribute). The identification may be performed after the user selects the business object. Alternatively, validation tool 150 may identify all the business attributes (corresponding to all the identified business objects) and store such information in a secondary storage. The business attributes corresponding to the business object selected may then be retrieved from the storage and then displayed as links to the user.

Thus, table 730 contains link 732 "Total Raw Cost", link 734 "Project Id", and link 736 "Budget Version Id" corresponding to the business attributes "total_raw_cost", "project_id" and "budget_version_id" of the selected business object "budget_version". Text box 740 displays the business attribute ("total_raw_cost") selected by the user by clicking on the corresponding link (in this example, link 732).

Table 750 depicts the various functions made available to a user to enable the user to specify rules. Link 752 "Sum" depicts a function that enables a user to calculate the sum of the values of the selected business attribute. Link 754 "Locate" depicts another function that enables a user to locate/identify data elements based on a condition. Link 756 "Compare" function enables a user to compare the values of two business attributes.

Text box 760 displays the function ("locate") selected by the user. It may be appreciated that some of the functions may take other parameters (such as a condition associated with the function "locate"). Text box 770 enables a user to specify the condition "<1500" associated with the function "locate" selected by the user. Though the interface is shown as allowing a user to specify a single requirement, it may be appreciated that the interface may be appropriately modified to enable a user to specify multiple requirements as part of a rule.

Thus, a user after selecting a business object, a corresponding business attribute, and a function (and specifying the parameters associated with the function) may click on button 780 (labeled "Generate XSL") to generate the rule based on the selections made by the user. In one embodiment described below, the rule is generated both in natural language (English) and in extended style sheet language (XSL).

FIG. 8 depicts a portion of software code executed to generate a rule for validating data from the values specified in a user interface in an embodiment. Though the instructions of the software code are shown specified in Javascript™ language, it should be appreciated that the features can be implemented in other environments and programming languages.

Lines 811-826 depict a function "nlmain" that generates the rule in natural language. The function may be invoked when a user clicks on button 780 in the user interface depicted in FIG. 7. In line 811, the function is shown taking the parameters "bo" representing the business object selected by the user, "attrib" representing the business attribute selected by the user, "func" representing the function selected by the user and "cond" representing the condition specified by the user as a parameter of the function "func". Thus, in the example depicted in the FIG. 7, the function "nlmain" is invoked with the values "budget_version", "total_raw_cost", "locate", and "<1500" for the respective parameters "bo", "attrib", "func" and "cond".

In line 812, a variable "str" is defined. Lines 813-818 are executed when the parameter "func" has the value "sum" (that is, the function "sum" is selected by the user) and generate the rule (stored in variable "str") in natural language for the selected business object/attribute and the function "sum". Similarly, lines 819-824 is executed when the parameter "func" has the value "locate" and generate the rule in natural language corresponding to the function "locate". In line 825, the rule stored in variable "str" is returned from the function "nlmain". The returned value represents the rule generated (in natural language) from the business object/attribute, function, and condition selected/specified by the user using the user interface depicted in FIG. 7.

Lines 827-851 depict a function "xslmain" that generates the rule in XSL. The function may be invoked after or before the invoking of the function "nlmain". In line 827, the function "xslmain" is shown taking parameters similar to the function "nlmain" as described in detail above. Further, lines 829-835 and lines 836-842 are executed when the parameter "func" has the respective values "sum" and "locate" and the executed lines generate the rule (stored in variable "str" defined in line 828) in XSL corresponding to the function "sum" and "locate" respectively.

In lines 846-849, value of the variable "str" is modified by adding a pre-defined header/footer (to the current value of "str") needed to include the rule in a rule/XSL file. The modified value is returned from the function "xslmain" in line 850. The returned value represents the rule generated (in XSL) from the business object/attribute, function, and condition selected/specified by the user using the user interface depicted in FIG. 7.

Thus, with respect to FIG. 7, validation tool 150 generates the rule both in natural language (English) and in XSL when button 780 is clicked by a user. The rule in natural language presents the requirements in a simple manner thereby enabling a business user to understand the generated rule. The rule encoded in XSL may be used to validate the received data.

Text area 790 depicts a rule generated in natural language. The text displayed in text area 790 corresponds to the text value returned from the function "nlmain" in line 825. As such, the generated text displayed in text area 790 "budget_version.total_raw_cost satisfies the condition <1500" specifies a rule having a requirement that the value of business attribute "total_raw_cost" of business object "budget_version" be less than "1500".

Text area 795 depicts a rule generated in XSL. The text displayed in text area 795 corresponds to the text value returned from the function "xslmain" in line 850. It may be observed that the text (encoded as XSL) displayed in text area 795, in particular, the text '<xsl:value-of select="budget_version//total_raw_cost<1500"/>' specifies the same requirement as the text in text area 790.

It may further be observed that the rule generated above (shown in text area 795) specifies a condition similar to the condition specified in lines 449-451 of FIG. 4. As such, the generated rule may be copied from text area 795 and added to a rule file, thereby enabling the validation of the received data using the rule file as described in detail in the above sections.

Though only a simple scenario (with a few functions) is shown in this example, it may be appreciated that the example may be extended to more complex scenarios (for generating complex rules, as depicted in FIG. 4) as will be apparent to one skilled in the relevant arts based on the disclosure provided herein.

It should further be appreciated that validation tool 150 may be implemented in a combination of one or more of hardware, software and firmware. The description is continued with respect to an embodiment in which various features are operative by execution of corresponding software instructions.

9. Digital Processing System

Figure 9:
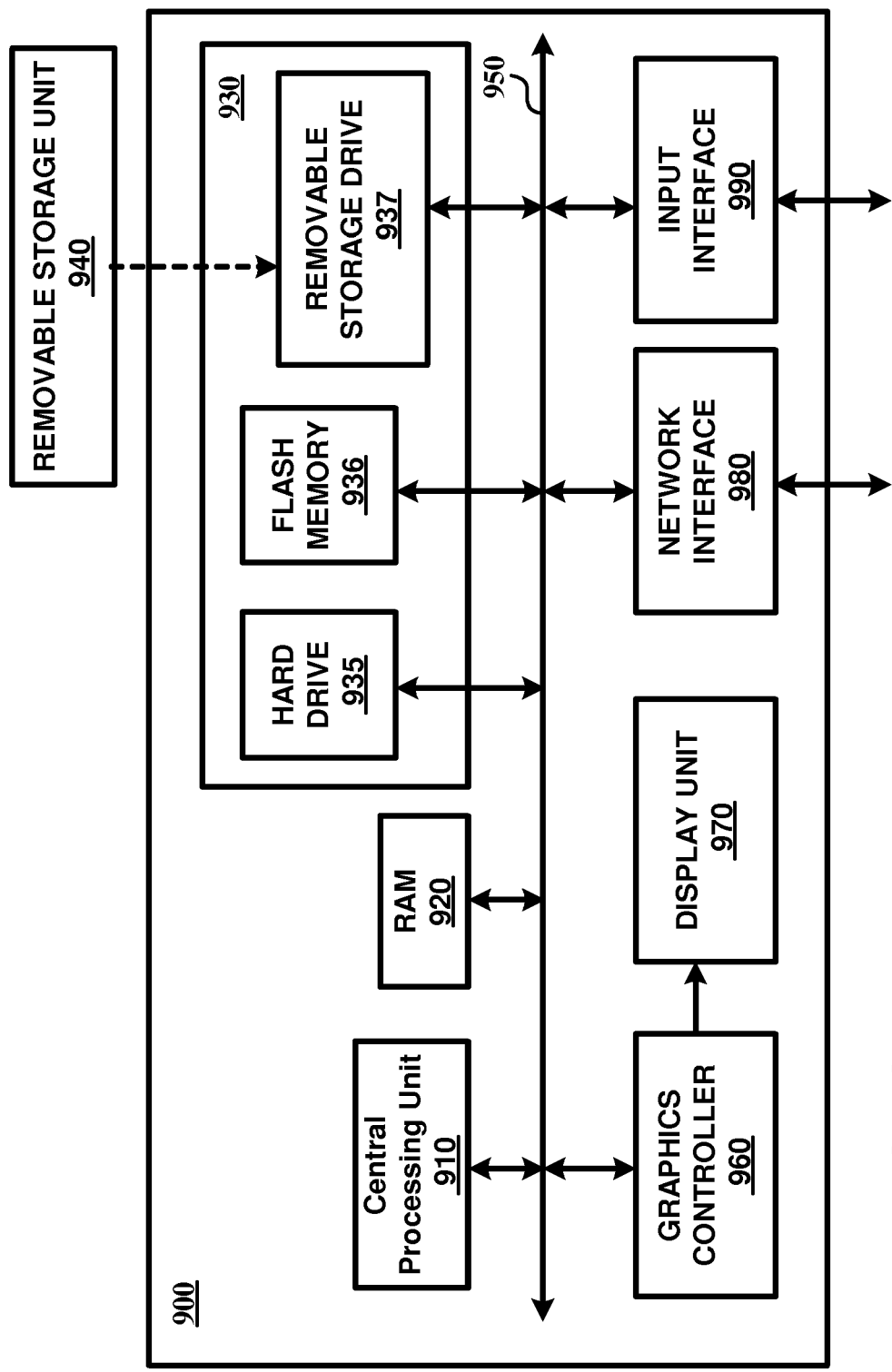
FIG. 9 is a block diagram illustrating the details of a digital processing system in which various aspects of the present invention are operative by execution of appropriate software instructions.

FIG. 9 is a block diagram illustrating the details of digital processing system 900 in which various aspects of the present invention are operative by execution of appropriate software instructions. Digital processing system 900 may correspond to client system 130 (executing validation tool 150). Digital processing system 900 may contain one or more processors (such as a central processing unit (CPU) 910), random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present invention. CPU 910 may contain multiple processing units, with each processing unit potentially being designed for a specific task. Alternatively, CPU 910 may contain only a single general purpose processing unit. RAM 920 may receive instructions from secondary memory 930 using communication path 950.

Graphics controller 960 generates display signals (e.g., in RGB format) to display unit 970 based on data/instructions received from CPU 910. Display unit 970 contains a display screen to display the images defined by the display signals (such as the user interfaces depicted in FIG. 5 and 7). Input interface 990 may correspond to a keyboard and a pointing device (e.g., touch-pad, mouse). Network interface 980 provides connectivity to a network (e.g., using Internet Protocol), and to communicate with other connected systems (such as server systems 110A-110C) of FIG. 1.

Secondary memory 930 may contain hard drive 935, flash memory 936, and removable storage drive 937. Secondary memory 930 may store the data (e.g., data and rules as depicted in FIGS. 3 and 4) and software instructions (e.g., portions of software code depicted in FIG. 8), which enables digital processing system 900 to provide several features in accordance with the present invention. Some or all of the data and instructions may be provided on removable storage unit 940, and the data and instructions may be read and provided by removable storage drive 937 to CPU 910. Floppy drive, magnetic tape drive, CD-ROM drive, DVD Drive, Flash memory, removable memory chip (PCMCIA Card, EPROM) are examples of such removable storage drive 937.

Removable storage unit 940 may be implemented using medium and storage format compatible with removable storage drive 937 such that removable storage drive 937 can read the data and instructions. Thus, removable storage unit 940 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 940 or hard disk installed in hard drive 935. These computer program products are means for providing software to digital processing system 900. CPU 910 may retrieve the software instructions, and execute the instructions to provide various features of the present invention described above.

10. CONCLUSION

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of enabling a user to validate a data stored on a server system, said data containing a first portion and a second portion, said method comprising:

enabling a user to specify a first rule associated with said first portion, and a second rule associated with said second portion, wherein said first rule specifies a logic by which said first portion is to be processed and said second rule specifies a logic by which said second portion is to be processed, wherein the logic specified in said first rule is different from the logic specified in said second rule;

receiving said first portion and said second portion of said data stored on said server system; and processing said first portion based on said first rule to generate a first result and said second portion of data based on said second rule to generate a second result, wherein said first result and said second result are used to determine compliance of said first portion and said second portion of data with a requirement to validate corresponding portions of said data stored on said server system, wherein said enabling, said receiving and said processing are performed in a client system.

2. The method of claim 1, wherein said logic specified in said first rule further specifies a condition that is to be satisfied by said first portion, wherein said condition comprises a comparison of said result with a data element for a logical relation, said method further comprising:

indicating to said user that said first portion is validated if said comparison of said result with said data element satisfies said logical relation.

3. The method of claim 2, wherein said data element is contained in said first portion.

4. The method of claim 1, further comprising displaying said first result on a display, wherein said user determines compliance of said first portion with said requirement.

5. The method of claim 4, wherein said receiving receives said first portion and said second portion from said server system at regular intervals of time.

6. The method of claim 5, wherein said rule is specified in XSL and said first portion and said second portion is received encoded as XML, wherein said processing processes said first portion and said second portion based on said first rule and said second rule to respectively generate said first result and said second result using a XSLT processor.

7. A method of generating rules to validate data stored on a server system, said method comprising:

receiving a portion of data stored on said server system;

enabling a user to specify a rule associated with said portion, wherein said rule specifies a logic by which said portion of data is to be processed to validate said portion of data, wherein said user is enabled to specify said rule after said portion is received from said server system; and processing said portion of data based on said rule to generate a result, wherein said result is used to determine compliance of said portion of data with a requirement to validate said portion of data stored on said server system, wherein said receiving, said enabling and said processing are performed in a client system.

8. The method of claim 7, wherein said enabling further comprises:

identifying a set of business objects and a plurality of set of business attributes in said portion of data, wherein each of said plurality of set of business attributes corresponds to one of said set of business objects in said portion of data;

displaying a user interface to said user, wherein said user interface displays identifiers of said set of business objects and said corresponding set of business attributes;

facilitating said user to select a subset of said set of business objects and a subset of said corresponding set of business attributes using said displayed identifiers and to provide said logic by which said subset of set of business objects and said subset of said corresponding set of business attributes are to be processed to validate said portion of data; and generating said rule based on said logic, said subset of said set of business objects and said subset of said corresponding set of business attributes.

9. The method of claim 8, wherein said displaying displays a plurality of functions in said user interface, wherein each of said plurality of functions represents a corresponding logic by which said portion of data is to be processed, wherein said facilitating facilitates said user to select a function from said plurality of functions, wherein said generating generates said rule based on said function, said selected subset of said set of business objects and said selected subset of said corresponding set of business attributes.

10. The method of claim 9, wherein said receiving receives said portion of data encoded as XML and said generating generates said rule in XSL, wherein a XSLT processor is used to validate said portion of data based on said rule.

11. A computer readable medium storing one or more sequences of instructions for causing a client system to enable a user to validate a data stored on a server system, said data containing a first portion and a second portion, wherein execution of said one or more sequences of instructions by one or more processors contained in said client system causes said client system to perform the actions of:

enabling a user to specify a first rule associated with said first portion, and a second rule associated with said second portion, wherein said first rule specifies a logic by which said first portion is to be processed and said second rule specifies a logic by which said second portion is to be processed, wherein the logic specified in said first rule is different from the logic specified in said second rule;

receiving said first portion and said second portion of said data stored on said server system; and processing said first portion based on said first rule to generate a first result and said second portion of data based on said second rule to generate a second result, wherein said first result and said second result are used to determine compliance of said first portion and said second portion of data with a requirement to validate corresponding portions of said data stored on said server system.

12. The computer readable medium of claim 11, wherein said logic specified in said first rule further specifies a condition that is to be satisfied by said first portion, wherein said condition comprises a comparison of said result with a data element for a logical relation, further comprising one or more instructions for:

indicating to said user that said first portion is validated if said comparison of said result with said data element satisfies said logical relation.

13. The computer readable medium of claim 11, further comprising one or more instructions for displaying said first result on a display, wherein said user determines compliance of said first portion with said requirement.

14. A computer readable medium storing one or more sequences of instructions for causing a client system to generate rules to validate data stored on a server system, wherein execution of said one or more sequences of instructions by one or more processors contained in said client system causes said client system to perform the actions of:

receiving a portion of data stored on said server system;

enabling a user to specify a rule associated with said portion, wherein said rule specifies a logic by which said portion of data is to be processed to validate said portion of data, wherein said user is enabled to specify said rule after said portion is received from said server system; and processing said portion of data based on said rule to generate a result, wherein said result is used to determine compliance of said portion of data with a requirement to validate said portion of data stored on said server system.

15. The computer readable medium of claim 14, wherein said enabling further comprises one or more instructions for:

identifying a set of business objects and a plurality of set of business attributes in said portion of data, wherein each of said plurality of set of business attributes corresponds to one of said set of business objects in said portion of data;

displaying a user interface to said user, wherein said user interface displays identifiers of said set of business objects and said corresponding set of business attributes;

facilitating said user to select a subset of said set of business objects and a subset of said corresponding set of business attributes using said displayed identifiers and to provide said logic by which said subset of set of business objects and said subset of said corresponding business attributes are to be processed to validate said portion of data; and generating said rule based on said logic, said subset of said set of business objects and said subset of said corresponding set of business attributes.

16. A set of systems comprising:

a database server to store a plurality of data elements in the form of a plurality of rows and a plurality of columns of a relational table;

a server system to provide a view of said data in the form of a plurality of business objects, each object corresponding to a row of said plurality of rows and containing a set of business attributes respectively corresponding to the data elements in the row, said server system being operable to retrieve a first set of data elements corresponding to a first business object from said database server and to send said first set of data elements encoded in eXtended Markup Language (XML), said first business object containing a first set of business attributes; and a client system operable to:

enable a user to specify a first rule associated with a first attribute of said first set of business attributes, and a second rule associated with a second attribute of said first set of business attributes, wherein said first rule specifies a logic by which data corresponding to said first attribute is to be processed and said second rule specifies a logic by which data corresponding to said second attribute is to be processed, wherein the logic specified in said first rule is different from the logic specified in said second rule;

receive said first business object from said server system; and process said first attribute of said received first business object based on said first rule to generate a first result and said second attribute of said received first business object based on said second rule to generate a second result, wherein said first result and said second result are used to determine compliance of said first business object with corresponding requirements to validate corresponding data stored on said database server.

17. The set of systems of claim 16, wherein said client system is further operable to:

maintain said first rule and said second rule in a rule file encoded in XML style language (XSL);

store said first business object in a data file in said XML, wherein a statement indicating that said rule file is corresponding stylesheet for said data file is also included in said data file; and execute an XSL transformation (XSLT) processor on said data file, wherein said statement in said data file causes said XSLT processor to apply said first rule and said second rule in said rule file on said first attribute and said second attribute respectively in said data file to generate a first result and a second result.

18. The set of systems of claim 17, for said enable, said client system being further operable to:

display a user interface to said user, wherein said user interface displays identifiers of said first set of business attributes;

facilitate said user to select said first attribute and said second attribute using said displayed identifiers and to provide corresponding logic by which data corresponding to said first attribute and said second attribute is to be processed; and generate said first rule associated with said first attribute and said second rule associated with said second attribute, wherein said maintain, said store and said execute operate after said generate.

19. The set of systems of claim 18, wherein said display, said facilitate and said generate operate after said receive of said first business object from said server system.

* * * * *

UNITED STATES PATENT AND TRADEMARK OFFICE
CERTIFICATE OF CORRECTION

PATENT NO. : 7,904,406 B2
APPLICATION NO. : 11/772255
DATED : March 8, 2011
INVENTOR(S) : Kumbi et al.

Page 1 of 1

It is certified that error appears in the above-identified patent and that said Letters Patent is hereby corrected as shown below:

In column 7, line 48, delete "Cost =Detail Cost?")" and insert -- Cost=Detail Cost?") --, therefor.

Signed and Sealed this
Fourth Day of October, 2011

David J. Kappos
*Director of the United States Patent and Trademark Office*